United States Patent [19]

Rezanka et al.

[11] Patent Number: 5,371,531
[45] Date of Patent: Dec. 6, 1994

[54] THERMAL INK-JET PRINTING WITH FAST- AND SLOW-DRYING INKS

[75] Inventors: Ivan Rezanka, Pittsford; John W. Lin, Webster; Gary R. Fague, Canandaigua; Lesley P. Dudek, Webster, all of N.Y.

[73] Assignee: Xerox Corporation, Stamford, Conn.

[21] Appl. No.: 975,027

[22] Filed: Nov. 12, 1992

[51] Int. Cl.⁵ ............................................. B41J 2/21
[52] U.S. Cl. ..................................... 347/43; 347/100; 347/102
[58] Field of Search ............... 346/1.1, 75, 140, 25; 106/20 D

[56] References Cited

U.S. PATENT DOCUMENTS

| | | | |
|---|---|---|---|
| 4,234,775 | 11/1980 | Wolfberg et al. | 219/10.55 |
| 4,401,024 | 8/1983 | Frentress | 346/140 X |
| 4,467,348 | 8/1984 | Fujii | 358/78 |
| 4,521,805 | 6/1985 | Ayata | 358/75 |
| 4,528,576 | 7/1985 | Koumura | 346/140 R |
| 4,530,961 | 7/1985 | Nguyen | 106/20 X |
| 4,580,148 | 4/1986 | Domoto | 346/140 R |
| 4,599,627 | 7/1986 | Vollert | 346/140 R |
| 4,672,432 | 6/1987 | Sakurada | 346/140 X |
| 4,682,216 | 7/1987 | Sasaki et al. | 358/79 |
| 4,726,844 | 2/1988 | Greenwood | 106/22 |
| 4,833,491 | 5/1989 | Rezanka | 346/140 R |
| 4,864,324 | 9/1989 | Shirota | 346/1.1 |
| 4,931,810 | 6/1990 | Iwata | 346/1.1 |
| 4,943,813 | 7/1990 | Palmer et al. | 346/1.1 |
| 4,952,942 | 8/1990 | Kanome et al. | 346/1.1 |
| 4,982,207 | 1/1991 | Tunmore et al. | 346/138 |
| 4,999,646 | 3/1991 | Trask | 346/11 |
| 5,018,884 | 5/1991 | Hirano | 346/140 X |
| 5,075,699 | 12/1991 | Koiko | 346/1.1 |
| 5,100,469 | 3/1992 | Pontes | 106/20 |
| 5,124,719 | 6/1992 | Matsuzaki | 346/1.1 |
| 5,130,723 | 7/1992 | Yamamoto | 346/1.1 |
| 5,156,675 | 10/1992 | Breton | 106/22 |
| 5,165,968 | 11/1992 | Johnson | 106/20 D X |
| 5,220,346 | 6/1993 | Carreira | 346/1.1 |

FOREIGN PATENT DOCUMENTS

| | | | |
|---|---|---|---|
| 188685 | 11/1983 | Japan | B41J 27/00 |
| 138249 | 6/1987 | Japan | B41J 3/04 |

OTHER PUBLICATIONS

Paul Yi and the Macuser Labs Staff, "The Affordable Rainbow: Color Inkjet Printers", Oct., 1991, pp. 141 to 152.

Primary Examiner—Joseph W. Hartary

[57] ABSTRACT

A multi-color ink-jet printer in which a first partial image is created on a recording medium, and then a second partial image is created on the same recording medium after the first partial image is substantially dried. The first partial image comprises an ink which dries at a slower rate than that of the second partial image. In one embodiment, means are provided for heating the recording medium prior to the creation of the second partial image.

15 Claims, 2 Drawing Sheets

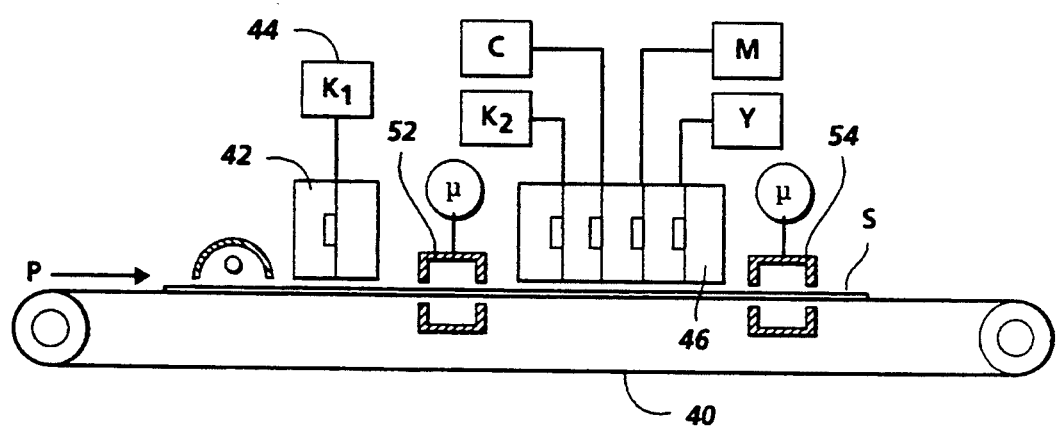
FIG. 3
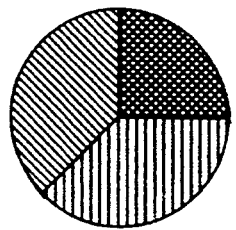 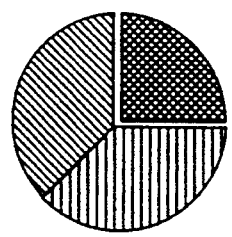 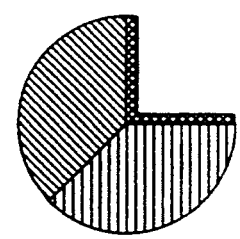
FIG. 4A  FIG. 4B  FIG. 4C

THERMAL INK-JET PRINTING WITH FAST- AND SLOW-DRYING INKS

Cross-reference is hereby made to the following U.S. patent application, incorporated herein by reference: Ser. No. 07/856,412, filed Mar. 23, 1992, for "Two-Pass Color Printing with a Thermal Ink-Jet Printer," assigned to the assignee of the present application.

The present invention relates to ink-jet printing, and is more particularly concerned with color printing using a combination of slow- and fast-drying inks to produce high quality images without intercolor bleeding.

In existing thermal ink jet printing, the printhead typically comprises one or more ink ejectors, such as disclosed in U.S. Pat. No. 4,463,359, each ejector including a channel communicating with an ink supply chamber, or manifold, at one end and having an opening at the opposite end, referred to as a nozzle. A thermal energy generator, usually a resistor, is located in each of the channels, a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight line direction towards a print sheet, such as a piece of paper. Because the droplet of ink is emitted only when the resistor is actuated, this type of thermal ink-jet printing is known as "drop-on-demand" printing. Other types of ink-jet printing, such as continuous-stream or acoustic, are also known.

In a single-color ink jet printing apparatus, the printhead typically comprises a linear array of ejectors, and the printhead is moved relative to the surface of the print sheet, either by moving the print sheet relative to a stationary printhead, or vice-versa, or both. In some types of apparatus, a relatively small printhead moves across a print sheet numerous times in swaths, much like a typewriter; alternatively, a printhead which consists of an array of ejectors and extends the full width of the print sheet may be passed once down the print sheet to give full-page images, in what is known as a "full-width array" (FWA) printer. When the printhead and the print sheet are moved relative to each other, imagewise digital data is used to selectively activate the thermal energy generators in the printhead over time so that the desired image will be created on the print sheet.

With ink-jet printing, it is also possible to create multicolor images on a print sheet. This type of printing may be used for full-color images, such as to reproduce a color photograph, or can be employed for "highlight" color, in which colored additions are made to a main portion of the image or text, which is typically black. In either case, the most common technique for color ink jet printing has been to sequentially image two or more colors, in separate printing steps, onto the single print sheet. This superimposition can be carried out in any number of ways. To take the example of a full-width apparatus printing black and one highlight color, an apparatus may print out the entire black portion of the desired highlight image on the sheet, and then recirculate the print sheet once again to image the highlight color portion of the image onto the same sheet from another printhead loaded with the colored ink; such a system has a serious disadvantage in the production of accurate registration of the composed images. Alternately, two printheads may be positioned very close to each other, and render the two portions of the image onto the print sheet almost simultaneously, although two different areas of the print sheet will be printed upon by the different printheads at the same time or with a small time lag. For a full-color process image, four types of ink (yellow, magenta, cyan, and black) are emitted from four separate printheads during printing as the print sheet is moved relative to them. Contouring of four-color images, e.g. for the reproduction of color photographs, are typically created by "superpixeling" or "dot-next-to-dot" (DND) techniques, in which each pixel of the image is created from three or more partially-overlapping spots of different colors, as described, for example, in U.S. Pat. No. 4,999,646.

In any ink-jet printing apparatus, but particularly in color-printing applications, a key concern is the rapid and efficient drying of the ink which has been placed on the print sheet by the printheads. If wet ink is allowed to remain on the print sheet for an appreciable length of time, the image is likely to smear as the print sheet continues on its path through the apparatus. In color ink jet printing situations, another important problem related to ink drying is known as "intercolor bleed." This is a bleeding of one color portion of the image into another portion of the neighboring image of different color. This becomes most apparent when black image is imaged immediately adjacent to an area printed with a color such as cyan, magenta, or yellow. In such a case, the black ink will be seen to bleed into the color area (e.g., cyan, magenta, and yellow) to create a conspicuous print defect. In fact, the lighter colored ink will bleed into the black portions of the image as well, but bleeding in this direction will obviously not be as noticeable.

In order to avoid the print defects caused by inefficient drying of ink on the substrate and intercolor bleed, a solution is to employ either "quick penetrating" inks or proper printing techniques. These quick penetrating inks have rapid drying properties, and they penetrate deeply into the paper fibers soon after their ejections onto the print sheet. It is hoped that, in the color context, the ink of one color will have dried before the imaging of the next color in the printing process, which may mean that the ink will be expected to dry within a small fraction of a second. Another problem with quick-penetrating inks in plain paper printing is known as "feathering," in which the ink is absorbed into the paper so quickly that traces of the ink appear to "feather out" around the areas on the print sheet where the ink was intended to be placed. This print defect may be tolerable in certain full-color images, but is certainly unacceptable in the printing of high quality text.

These print-quality problems are intimately related to the selection of papers for use in the printer. Many popular brands of ink-jet printers currently commercially available mandate the use of coated papers, particularly pigment-coated papers (e.g. silica coated paper), for satisfactory print quality. It is likely that such specially-treated papers will be more expensive than familiar uncoated bond papers typically used for typing. Ideally, in an office situation, a customer would like to use the same paper in an ink-jet printer as it is used in the customer's typewriters or xerographic copiers. This problem of using low-cost plain-paper in ink-jet printing has been a major concern in the industry, as witnessed by the article entitled "Color Ink-Jet Printers" in *MacUser*, October 1991, pp.141–152. Thus, it is desirable that a system for multi-color ink-jet printing be able to take into account the properties of plain, uncoated paper to create images of acceptable quality. Some of the ink-jet printing techniques are described below as references.

U.S. Pat. No. 4,234,775 discloses the concept of using applied microwave energy to remove moisture from a moving web.

U.S. Pat. No. 4,599,627 discloses an ink-jet printer which employs a writing fluid having two components. One component is located in a separate reservoir, which feeds into a second printhead which is disposed farther from the sheet than the first printhead. The second printhead is mounted on the same carriage with the printhead in an offset position, and ejects the second component onto locations on the medium corresponding to the printed characters made by the printhead. The use of two fluid components achieves a reduced drying time and eliminates clogging of the printhead.

U.S. Pat. No. 4,833,491 discloses a color ink-jet printer having an ink delivery system adapted for multicolor images. When a given printing mode, such as highlight color, is selected, ink supply systems associated with particular ink cartridges are purged and reconnected as needed to print particular colors.

U.S. Pat. No. 4,943,813 discloses various methods of using an ink-jet device for creating overhead transparencies. In order to avoid certain common problems associated with this process, the patent discloses techniques such as printing a first spot of color at a selected location in a first pass of an ink-jet printer, and printing a second spot of color at the same location in a second pass; printing alternate spots of color in successive scans; and printing alternate lines of color in successive passes.

U.S. Pat. No. 4,952,942 discloses a color ink-jet printing method using inks of two or more colors including yellow. Mixed color areas containing yellow are created by using a plurality of inks with different dye concentrations for at least one color, wherein the yellow ink is attached onto the recording medium always prior to attachment of other inks onto the medium.

U.S. Pat. No. 4,982,207 discloses a heater construction for an ink-jet printer having a rotary print platen for holding a print sheet. The platen heater includes a hollow shell having vacuum holes for sheet attachment. A heating foil is mounted in heat transfer relation with the interior of the shell and is coupled by brush contacts to an electrical power source.

U.S. Pat. No. 4,999,646 discloses a full-color ink-jet printing technique in which contoured four-color images, such as in color photographs, are created by "superpixeling" or "dot-next-to-dot" (DND) techniques, in which each pixel of the image is created from three or more partially-overlapping spots of different colors.

U.S. Pat. No. 5,124,719 discloses an ink composition including a first component, a second component having a higher melting point than the first component, and a colorant. During printing, the first component is intended to permeate into the recording medium. As the concentration of the first component decreases and the temperature of the ink cools, the second component with the colorant will solidify and the first component will act to fix the second component and colorant to the medium.

U.S. Pat. No. 4,682,216 discloses a method of forming a full-color image. When a black component of a color pictured data is smaller than a predetermined value, the black component is expressed by using the combination of three colored inks. When the black component is larger than the predetermined value, the black area is rendered by using alternately a black ink and the three color ink combination.

According to the present invention, there is provided an apparatus for printing an image on a sheet. A first ink-jet printhead is adapted to print a first portion of the image with an ink of a first type on the sheet. A second ink-jet printhead is adapted to print a second portion of the image with an ink of a second type on the sheet with the ink of the second type being adapted to dry at a faster rate than the ink of the first type. The ink on the second portion of the image is printed on the sheet after the first portion of the image has substantially dried.

According to another aspect of the present invention, there is provided a method of printing an image on a sheet according to image data. The image data is analyzed to determine locations on the image where areas of different colors abut each other on the sheet. First and second portions of the image are printed, the second portion being of a different color than the first portion of the image. Ink is withheld on the sheet in the areas adjacent the abutment locations to provide a gap of a predetermined width between areas of the image to be printed as the first portion of the image and the second portion of the image.

According to still another aspect of the present invention, there is provided another method of printing an image on a sheet according to image data. The image data is analyzed to determine locations on the image where areas of different colors abut each other on the sheet. Ink of a first type and an ink of a second type are selected for printing at a location on the image where areas of the color of the ink of the first type abut areas of different colors on the sheet, depending on a predetermined physical characteristic of one of the ink of the first type and the ink of the second type. The ink of the second type is substantially the same color as the ink of the first type.

In the drawings:

FIG. 3 is an elevational view of a full-width array embodiment of an ink-jet printer incorporating the present invention.

FIGS. 4A, 4B and 4C represent example of multi-color pie-charts, illustrating certain printing methods according to the present invention.

Figure 1:
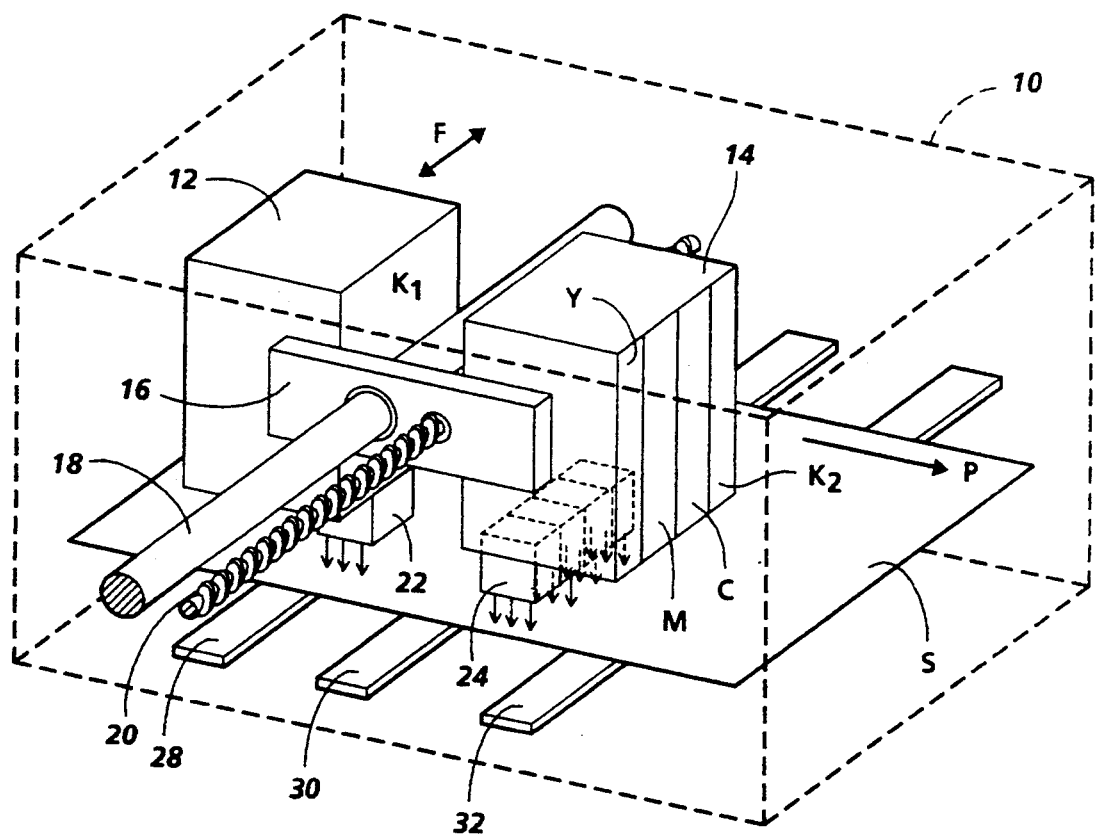
FIG. 1 is an elevational view of a swath-printing ink-jet printer incorporating the present invention.

FIG. 1 is a simplified elevational view of the relevant portion of a drop-on-demand thermal ink-jet printer, generally indicated by housing 10. A sheet S, a recording medium for the creation of an image thereon, is caused to move through the printer in process direction P. The means for causing the motion of the sheet S through process direction P will be apparent to one skilled in the art, such as rollers, moving belts, or a reciprocable platen. As sheet S moves through process direction P, it passes a printhead station comprising, in this embodiment, a first printhead cartridge 12, and a second printhead cartridge 14, which are together mounted on a carriage 16 for preferably unison motion relative to the sheet S. The carriage 16 is mounted within housing 10 in such a way that the printhead cartridges 12 and 14 may be caused to reciprocate relative to the sheet S in a fast-scan direction, indicated as F, which is preferably transverse to the process direction P. In order to carry out this motion, carriage 16 may be mounted on a guide rail 18, and also engaged with a lead screw 20, as shown. In this particular embodiment, lead screw 20 is double threaded, to create a back-and-forth motion of carriage 16 as a tooth on carriage 16 (not shown) engages with the threads of lead screw 20, which is rotated by means not shown. Alternatively, cartridges 12 and 14 are mounted on a shaft and they can be moved in a transverse direction to P y a wire wound on a motorized roller. Various related and other schemes for causing the reciprocating motion of carriage 16 in a fast-scan direction relative to the sheet S are familiar to the art of ink-jet printers, and any known method may be employed to create this scanning motion. Each printhead cartridge 12, 14 mounted on carriage 16 includes an ink supply and a drop-on demand ink-jet printhead operatively connected thereto. Typically, a printhead cartridge such as 12 or 14 will be intended to be removable and in the form of a customer-replaceable unit, or CRU. When the ink supply within a cartridge is exhausted, it is typically intended that the entire cartridge and printhead be replaced. Numerous designs for such a printhead cartridge are known in the art and currently commercially available.

Preferably, the printhead cartridge 12 is disposed upstream, in the process direction, of printhead cartridge 14. Printhead cartridge 12 includes a main body which forms the container for the ink supply, and extending therefrom toward the sheet S is a printhead 22. The ink supply preferably contains a slow-drying black ink, indicated in the figure as $K_1$, the function of which will be described in detail below. The printhead 22 may be of a form typically known in the art, such as comprising a linear array of drop-on-demand thermal ink-jet ejectors, typically spaced 300, 400 or 600 to the inch and numbering, in such a printhead, 128 ejectors in the array. Image-processing means (not shown) are used to operate the ejectors, in known manner, to cause the ejectors to emit ink in imagewise fashion as the printhead is caused to move relative to a particular location on the sheet S.

Printhead cartridge 14 is generally similar in operation to the printhead cartridge 12, except that, in this embodiment, printhead cartridge 14 comprises multiple ink supply chambers and multiple printheads. In this embodiment, printhead cartridge 14 is subdivided into three separate ink supplies, indicated as shown as the primary colors, cyan, magenta, and yellow, or C, M, Y, respectively. Further, the printhead cartridge 14 may include a fast-drying black, indicated as $K_2$, to be applied in the second step. Such a process black is typically intended for full-color images, such as color photographs and pictorial images, wherein black is intended to blend visually with neighboring colored areas. The process black in the second step should preferably have a drying time comparable to that of the other color inks in the second step, and shorter drying time than the black applied by printhead cartridge 12 in the first step, as will be explained in greater detail below. Each ink supply C, M, Y, and $K_2$ is in communication with its own dedicated linear array of ejectors which are preferably placed in close proximity to one another in printhead 24. The arrows shown emanating from printhead 24 indicate an example that four separate linear arrays are operating to place droplets of ink on the sheet S.

With the apparatus shown in FIG. 1, it will be appreciated that, when a sheet S is caused to move in process direction P through the apparatus, the printhead cartridges 12 and 14 mounted on carriage 16 will be caused to move back and forth in a fast scan transverse direction F while the ejectors within the respective printheads thereof create images on the sheet S. It will further be appreciated that, as printhead cartridge 12 is operatively disposed upstream of printhead cartridge 14, that, relative to a particular location on the sheet S, a portion of an image created with printhead cartridge 12 will be placed on the sheet S earlier in time than the image created by printhead cartridge 14 on an adjacent, or substantially the same, location on the sheet. There will thus be a time lag between the ejection of ink from printhead cartridge 12 on a particular location and the ejection of ink from printhead cartridge 14 to the generally same or adjacent location. A typical duration of the printing of a swath in an ink-jet printer is between 0.2 and 2 seconds. Typically, printhead cartridge 12 will be at least one or two swaths "ahead" of printhead cartridge 14. It is this time lag between the printing of the swaths which enables a key function of the present invention, as will be explained below.

Also included in the printer of FIG. 1 is a set of paper-heating means, generally shown as elements 28, 30, and 32. As can be seen in the illustration, element 28 is disposed just upstream of printhead 22 of printhead cartridge 12, while element 30 is disposed, in the process direction, between printhead 22 of printhead cartridge 12 and printhead 24 of printhead cartridge 14. Element 32 is located after the cartridge 14 and printhead 24 in the down stream of imaging process. Elements 28, 30 and 32 are simply shown as areas of applied heat, as would be possible with, for example an area of electrical resistance, or an infrared heater, but any kind of known means for heating a controlled area of a paper sheet may be used, such as radiant microwave or forced hot air convection or heating with applied vacuum. Although the elements 28, 30 and 32 are shown in the drawing as applied to the non-image side of sheet S, for various purposes it may be preferred, as needed, it is also possible to cause the sheet S to be heated from the image side, in which case elements 28, 30, and 32 whatever their actual combination, would be disposed on the image side of sheet S. If the heating elements are placed below the sheets, then elements 28, 30, and 32 can be combined into a single continuous heating device. The purpose of applying heat to the sheet S in either position, either before the application of ink from printhead 22 or between the applications of ink from printheads 22 and 24, and thereafter, is to increase the rate of drying of ink placed on the sheet. These drying means simply introduce heat into the system in order to increase ink penetrate rate into the recording substrate, moisture removal and the rate of evaporation of ink placed on the sheet. If the sheet S is heated before the application of any ink, there is intended to be at least some excess heat energy remaining in the paper by the time ink from one printhead (i.e., No. 22) contacts the sheet. In the case of element 30, the heat transferred therefrom into sheet S may be used directly for increasing the ink penetration into the recording substrate from printheads 24 and the rate of drying of ink emitted onto the sheet from printhead 22. The element 32 is employed to further increase the drying of various inks after the complete imaging process. In this invention, high quality color images including graphics and texts can be obtained with high optical density, sharp images, high resolution, and without intercolor bleeding on plain paper and coated papers.

Figure 2:
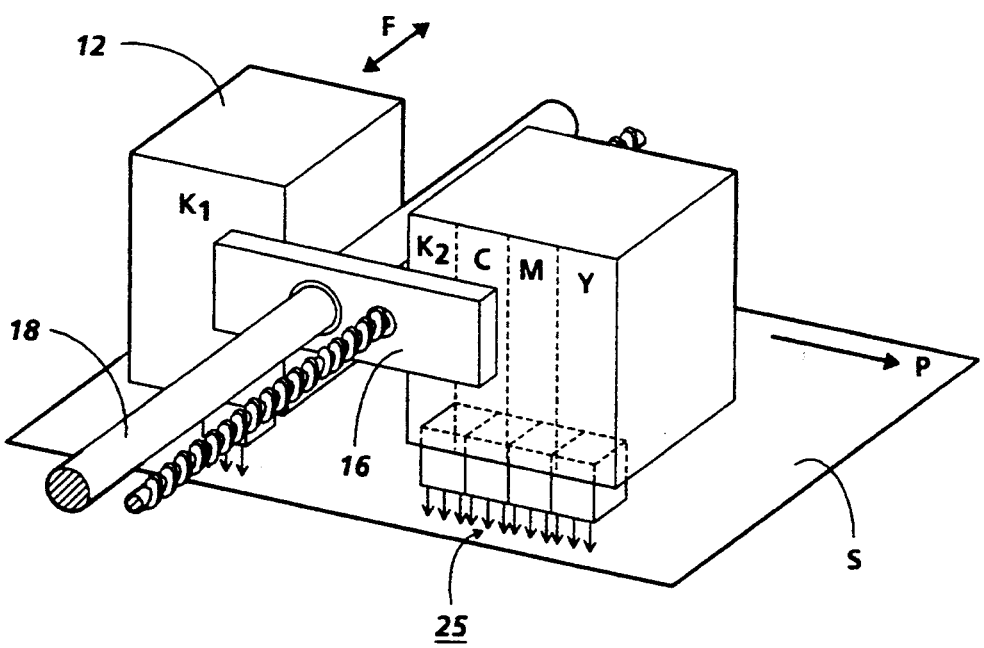
FIG. 2 is an elevational view of another embodiment of a swath-printing ink-jet, printer incorporating the present invention.

FIG. 2 shows an alternate swath-printing embodiment of the present invention, wherein the fast-drying color inks of the second step are emitted from printhead cartridge 15. The printhead cartridge 15 of FIG. 2 is similar in function to the printhead cartridge 14 in FIG. 1, however. the separate printheads for each of the fast-drying colors are disposed transverse to the fast-scan direction F in such a manner that with each swath printed as the carriage 16 moves along guide rail 18, each one of the separate printheads 25 (cyan, magenta, yellow, and black printheads) effectively prints a separate swath of color images on the sheet S. This separation of each color in its own swath as it is printed allows for even further time delays between the superimposition of different colors on the sheet S. This arrangement allows one another advantage of the arrangement of FIG. 2 is that the separate swaths for each colored ink will permit printing to take place in either direction of motion of the printhead (left to right or right to left direction); the arrangement of FIG. 1 is preferred to operate in a uni-directional mode, because the order of colored inks placed on a sheet will have a subtle but possibly noticeable effect on the hue of inks blended on the sheet. In the FIG. 2 design, however, the order of inks will be the same regardless of the direction of the carriage 16 (left to right or right to left) for a particular swath.

FIG. 3 is a simplified elevational view showing the basic elements of a full-width array (FWA) thermal ink-jet printer incorporating the present invention. In a FWA printer, instead of causing relatively short printheads to reciprocate across a sheet moving in a process direction, relatively long full-width linear arrays of ejectors are provided which extend across the entire width of a sheet on which an image is to be printed. In the view of FIG. 3, these linear arrays are shown end-on. In FIG. 3, the sheet S is caused to move in a process direction P by being placed on a belt 40, although once again other means for causing the motion of the sheet S relative to the printheads are known and can be used, such as placing the sheet S on a rotating drum or a reciprocating platen. A first full-width printhead 42 is located at one point along the process direction of the sheet S, and is fed with an ink supply 44. Somewhat downstream of printhead 42 is a set of printheads (black, cyan, magenta, and yellow printheads) generally indicated as 46. These printheads, in one embodiment of the invention, are each fed with ink of a primary color, C, M, and Y. In addition, one of the printheads, printhead set 46, is fed with a black ink indicated as $K_2$. The ink supply $K_2$ differs from the ink supply $K_1$ in ink supply 44, in that ink $K_2$ is of a different chemical composition so that it will be caused to dry relatively quicker than the "slow-drying" black ink $K_1$, for reasons which will be explained in detail below.

In addition to the full-width arrays of ejectors 42 and 46, there is also disposed along the path of the sheet S ink-drying means, which in this particular embodiment are shown as an infra-red lamp or a cavity for the transmission of microwave energy onto the sheet S, or a heated platen or a heated drum although once again other means for increasing the rate of evaporation on the sheet S may also be used. For illustration purpose, infrared lamp 50 is intended to convey infrared energy to the surface of the sheet S before printing by printhead 42. Microwave cavity 52 is operatively connected to a microwave source, and tuned to a frequency which will stimulate the liquid component of ink placed on the sheet S, thereby causing the ink penetration and evaporation thereof. The use of microwave energy may be less useful in initial paper heating, because microwave heating is more effective upon compiling the microwave with ink components, as would be found in liquid ink on the sheet. A further microwave cavity 54 may be provided for a final application of energy to the ink placed on the sheet S after the second printing step. Effective ink drying and prevention of intercolor bleeding are important for high quality, high speed color ink-jet printing.

Having explained the basic necessary physical elements of the present invention, discussion will now turn to practical aspects of two-step creation of images on a sheet S according to the present invention. A key principle of the present invention is that ink placed on the sheet S in an imagewise fashion by the first step of the printing process, that is, by printhead cartridge 12 in the embodiments of FIGS. 1 or 2, or by printhead 42 in the embodiment of FIG. 3, will be done with a relatively slow-drying ink, which is then permitted to substantially dry in an intervening step before application of ink from the second set of printheads, that is from printhead cartridges 14 or 15 in the embodiments of FIGS. 1 or 2, respectively, or the printhead set 46 in the embodiment of FIG. 3. According to the present invention, the ink applied to the sheet S in the second step is generally of a composition that will dry faster than the ink applied in the first step. As mentioned above, a key print quality defect in the printing of full-color ink-jet images is intercolor bleeding, caused by the undesired mixing when inks of two separate colors are printed next to each other. The intercolor bleeding problem is most serious with black ink, both because of the dominance of black ink in printing text and graphics, and also because black ink, by its very color and high optical density, will conspicuously interfere with any other kind of color ink. The two-step technique enabled by the present invention is most advantageously used in printing a relatively slow-drying black ink in the desired location of the image in the first step, and then allowing the slow-drying black ink to dry substantially or completely on the imaging surface, and then printing the remaining colors in the desired locations. A "slow-drying" ink is typically defined as having a drying time of more than 1 second at room temperature, while a "fast-drying" ink is defined as capable of drying to a satisfactory extent in less than 1.0 second. The slow drying ink usually has a surface tension greater than 45 dyne/cm and the fast drying type ink has a surface tension less than 45 dyne/cm at room temperature. Because most customer's printing jobs involve the printing of both black text and a full-color graphic on the same sheet, the slow-drying ink is preferably used to print all text. The slow-drying black ink usually does not penetrate into the paper sheet quickly, and also tends to mix with neighboring color ink to create the undesired intercolor bleeding. However, the slow-drying ink can generate text with sharp edges which can not be easily produced by the fast-drying inks. By printing the slow-drying black ink first, the slow-drying black ink is allowed more time to penetrate into the paper to substantially avoid the intercolor bleeding problem.

It has been found, further, that superior print quality results are obtained when the fast-drying inks in the second step of the process, particularly those emitted from printhead set 46 from the embodiment of FIG. 3, if the last ink to be placed on the sheet is yellow. Ideally, the best sequence for placement of inks in the second step is fast-drying black, magenta or cyan and then yellow. It may also be desirable, according to some designs, to leave out the fast-drying black entirely in full-color images (such as reproductions of color photographs) and creating the dark areas in such images by a superimposition of the three primary colors. If the fast-drying black is not used in the second step of the process, all text is preferably printed with the slow-drying black ink in the first step.

Another process parameter which has a substantial effect on print quality is the amount of ink per drop placed on the sheet with every emission of ink from any printhead. In general, the more ink placed on the sheet, the greater the likelihood that intercolor bleeding will occur. It has been found that, preferably, the amount of ink emitted by each nozzle when disposed near a particular location on the sheet S be less than 150 picoliters in a printer having a resolution of 300 spots per inch (spi). Further, it has been found that, particularly in the case of creating images from artificially-made graphics documents (such as computer-created screens and charts, as opposed to color photographs) that intercolor bleeding can be reduced by reducing the drop volume of ink per ejection to locations on the sheet wherein an area of one color abuts an area of a different color. Typically, as in a printed pie-chart, the borders between the two different colored areas in the chart are likely locations for serious intercolor bleeding. One technique that has been found successful in avoiding intercolor bleeding in artificially-made graphic images is to intentionally create gaps of color near the lines of abutment in the image. That is, for the outermost rows of pixels for any colored area, a deliberate "white gap" of blank pixels may be created, thereby allowing a border of white space between abutting colored areas and therefore reducing or eliminating intercolor bleeding. Ideally, the white gap should be large enough to avoid the touching of two neighboring ink areas through ink spreading, but small enough to prevent the formation of noticeable, undesirably large gaps. The number of necessary pixels to be removed to create the proper-sized gaps may be determined experimentally, and may vary by the types of inks and substrates used in the printing. A white gap of not more than three pixels in a 300 spi image, or between 2 mils and 15 mils on the sheet, is preferred. This method is illustrated in FIGS. 4A and 4B. FIG. 4A represents an example pie-chart desired to be printed, wherein, for the sake of illustration, one portion is to be printed black and the others in different colors, as part of the second step, as shown by the cross-hatching. FIG. 4B shows an exaggerated view of the gap between the black portion of the pie-chart and the other portions. When this gap is less than 15 mils in width, however, it will be considerably less conspicuous, yet it will still be wide enough to prevent interaction between the slow-drying black ink of the black portion and the other colored portions printed with a fast-drying ink.

Another technique for the avoidance of intercolor bleeding is to analyze the image data to determine the locations on the image of the color of the ink in the first printing step abuts an area on the image of another color. In the case where slow-drying black is printed in the first step and the colors and fast-drying black in the second, it may be preferred that black areas abutting colored areas be printed in fast-drying black ink, while non-abutting black areas, particularly text, be printed in slow-drying black ink. Indeed, an image may be so processed that, in a solid black area on the image, the border areas thereof (for example the outermost 1/10 of an inch around the area) may be selected to be printed in fast-drying ink, with the internal black remaining area in slow-drying ink. FIG. 4C gives an exaggerated view of how the outer border of the black portion of the pie-chart of FIG. 4A may be printed, while the area enclosed by the border will be printed with slow-drying black in the first step. In this way, slow-drying ink will not abut fast-drying ink in the image, except for fast-drying ink of the same color (e.g. black).

When drying means for heating the sheet in the course of the creation of an image thereon is employed, print quality may be caused to improve significantly, particularly with plain, uncoated paper. As mentioned above, this heating may take place either before any image is created on the sheet, or between the creation of the first and second partial images, or both, as well as after the completion of printing desired images, for a variety of reasons. First, heating of the paper and ink in the printing of color images in the imaging steps will enhance the rate of the ink penetration and evaporation of the solvent (usually water) of the inks before the inks can mix together on the sheet. Second, the heating of the sheet and image can accelerate the penetration of the ink into the paper. Third, if the temperature of the ink on the sheet is higher than room temperature due to the heat treatment, then the ink viscosity will be lower, thus, facilitating the speed of ink being absorbed into the paper. Fourth, if a chemical reaction for immobilization of the colorants in the ink in the second step takes place, the reaction rate will be increased due to the increase in temperature. Fifth, the use of heat treatment of the sheet can also reduce the degree of cockle, which often occurs in printing water-based inks on plain papers and transparencies. Although heating can be applied at different locating, in a practical ink-jet printer, it is preferred to apply the heat treatment only within a relatively small area near the imaging zone in the vicinity of various printheads, for reasons of efficiency and lower energy consumption.

It has been found that the delay time between printing two color images adjacent to each other on a sheet is a key factor in ultimate production of excellent print quality. On a typical letterhead bond paper without heat treatment, a delay of 10-15 seconds is preferred in order to completely eliminate intercolor bleeding. For better plain papers (such as smooth but uncoated papers), a time delay from 3.0 to 10 seconds between printing steps is found to be suitable at room temperature, and this delay time may be decreased by heating of the paper during the printing process. The shorter time delay afforded by paper heating will not only serve to increase the maximum possible rate of printing (in terms of sheets per minute) of a given printer design, it will also permit the locations of printheads for the two printing steps to be made closer together, thus allowing a smaller "footprint" for the apparatus.

Many inks can be used in this invention. In the preferred embodiment of the present invention, the following types of ink for various colors have been found to be satisfactory. The following list is intended to provide a non-exclusive list of possible inks for one illustration purpose.

| SLOW-DRYING BLACK INKS | | |
|---|---|---|
| 1. | 11.52% | BASF X-34 (30% Concentrated dye liquid) About 3.45% Pure dye mixture |
| | 20% | Ethylene glycol |
| | 3.5% | Isopropanol |
| | 0.05% | Polyethyleneoxide (M.W = 18.5K) |
| | Balance | distilled water |
| | 1.2 micron filtration | |
| 2. | 5% | Carbon Black (Raven 5250) |
| | 5% | Ethylene glycol |
| | 7% | N-Methylpyrrolidinone |
| | 1.25% | Lomar D (Henkel) |
| | 0.4% | Duponol (Sodium Lauryl Sulfate) |
| | 0.05% | Dowicil 200 (Fungicide, Dow Chemical Co.) |
| | Balance | distilled water |
| | 1.2 micron filtration | |
| 3. | 5% | Carbon Black (Raven 5250) |
| | 8% | Ethylene glycol |
| | 7% | N-Methylpyrrolidinone |
| | 1.25% | Lomar D (Henkel) |
| | 0.4% | Duponol (Sodium Lauryl Sulfate) |
| | 0.05% | Dowicil 200 (Fungicide, Dow Chemical Co.) |
| | Balance | distilled water |
| | 1.2 micron filtration | |
| 4. | 5% | Carbon Black (Raven 5250) |
| | 25% | Ethyleneglycol |
| | 1.25% | Daxad 19K (W. R. Grace) |
| | 0.4% | Duponol (Sodium Lauryl Sulfate) |
| | 0.1% | Dowicil 200 (Fungicide) |
| | Balance | is distilled water |
| | 1.2 micron filtration | |

In addition to these inks, there are also inks which are particularly conducive to microwave drying. In general, it has been found that the performance of such inks in this context is substantially improved by the addition of certain salts, which serve to adjust the conductivity of the ink to a desired optimal range. Such a salt must improve the conductivity and also be readily soluble in the solvent/humectant of the ink. For this purpose, one particularly effective type of salt is ammonium salts, and particularly $NH_4Cl$.

Further, with inks to be used with microwave drying, it is desired to design an ink with a controlled penetration, so that the liquid ink on the surface of the (typically uncoated paper) sheet will provide a suitable "cross section" upon which the radiation can act. Controlled ink penetration is typically accomplished by addition of a small molecule organic penetrant, and the preferred additives of this type include isopropanol or benzyl alcohol. These penetrants must be used judiciously, however, to balance the competing dangers of feathering (caused by insufficient penetration) and show-through (caused by too-aggressive penetration).

Listed below is the formula of the currently preferred slow-drying black ink suitable for microwave drying, as in the apparatus of the present invention. The following formula has been tested to have a surface tension of 44 dynes/cm and a conductivity of 26.4 millimho/cm:

| 11.5% | BASF X-34 (3.5% dye solids in ink) |
|---|---|
| 20% | Ethylene Glycol |
| 2.5% | Benzyl Alcohol (Baker Analyzed) |
| 1.9% | Ammonium Chloride (Aldrich) |
| 0.05% | Polyethyleneoxide (M.W = 18.5K) |
| Balance | Water |

| FAST-DRYING INKS | |
|---|---|
| Black Ink: | |
| 7.5% | Food Black #2 (Bayscript) |
| 18% | 60/40 Butyl Carbitol/Glycerine Solution |
| 2% | Cyclohexylpyrrolidinone (CHP) |
| 0.05% | Polyethyleneoxide (M.W = 18.5K) |
| 1.0% | Pluronic PE 6400 |
| Balance | Distilled Water |
| 1.2 micron filtration | |
| Cyan Ink: | |
| 3% | Porject Cyan (ICI) |
| 16% | 60/40 Butyl Carbitol/Glycerine Solution |
| 2% | Cyclohexylpyrrolidinone (CHP) |
| 0.05% | Polyethyleneoxide (M.W = 18.5K) |
| Balance | Distilled Water |
| 1.2 micron filtration | |
| Magenta Ink: | |
| 4.5% | Project Magenta (ICI) |
| 16% | 60/40 Butyl Carbitol/Glycerine Solution |
| 2% | Cyclohexylpyrrolidinone (CHP) |
| 0.05% | Polyethyleneoxide (M.W = 18.5K) |
| Balance | Distilled Water |
| 1.2 micron filtration | |
| Yellow Ink: | |
| 3.0% | Hoechst Yellow (Tartazine) |
| 16% | 60/40 Butyl Carbitol/Glycerine Solution |
| 2% | Cyclohexyl pyrrolidinone (CHP) |
| 0.05% | Polyethyleneoxide (M.W = 18.5K) |
| Balance | Distilled Water |
| 1.2 micron filtration | |

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

We claim:

1. An apparatus for printing an image on a sheet movable in a process direction, the apparatus comprising:
   a. a first ink jet printhead mounted at a first location and containing a first type ink for printing a first portion of the image on the sheet, said first type ink having a surface tension greater than 45 dynes/cm at room temperature; and
   b. a plural number of secondary ink jet printheads mounted apart at a second location gapped from said first printhead, said secondary printhead each containing a second type ink for printing on the sheet a second portion of the image abutting said first portion thereof, said second type ink having a surface tension less than 45 dynes/cm at room temperature for preventing bleeding of said second type ink into said first type ink.

2. The apparatus of claim 1, wherein said second location is downstream of said first location relative to the process direction.

3. The apparatus of claim 1, including heating and drying means located in said gap between said first printhead and said secondary printheads for drying said first type ink in said first portion of the image to prevent bleeding of said first type ink into a second type ink in said abutting second portion of the image.

4. The apparatus of claim 1, including an additional heating means mounted downstream of said second location of said secondary ink jet printhead for heating and drying said first and said second portions of the image on the sheet so as to prevent bleeding of one of said first and said second type inks into the other.

5. A method of printing an image on a sheet movable in a process direction, the method comprising the steps of:
   a. printing a first portion of the image having sharp edges by using a first type ink having a surface tension greater than 45 dynes/cm at room temperature; and
   b. printing a second portion of the image in contact with said first portion using a second type ink having a surface tension less than 45 dynes/cm at room temperature so as to prevent said second type ink from bleeding into said first type ink.

6. The method of claim 5, including a step of heating said first portion of the image prior to printing said second portion thereof.

7. The method of claim 5, including a step of heating the sheet after printing said first and said second portions of the image.

8. An ink jet printing apparatus comprising:
   a. means for movably supporting an image receiving sheet;
   b. a primary printhead mounted at a first location and including a first set of droplet ejecting nozzles and a first ink supply containing a slow-drying first black ink for printing high quality black portions of images on the receiving sheet; and
   c. a plural number of secondary printheads mounted gapped from said primary printhead at a second location for printing abutting multicolor portions of the images said plural number of secondary printheads including a printhead containing a fast-drying, second black ink having a surface tension of less than 45 dynes/cm for preventing said second black ink from bleeding into abutting multicolor portions of the images.

9. The ink jet printing apparatus of claim 8, wherein said slow-drying, first black ink has a surface tension greater than 45 dynes/cm.

10. The ink jet printing apparatus of claim 8, wherein said plural number of secondary print units is four.

11. The ink jet printing apparatus of claim 8, wherein said plural number of secondary printheads further includes a print unit containing cyan ink, a print unit containing magenta ink, and a print unit containing yellow ink, said cyan, magenta and yellow inks each having a surface tension less than 45 dynes/cm.

12. The ink jet printing apparatus of claim 8, including heating means located in the gap between said primary printhead and said plural number of secondary printheads for heating black image portions printed on the sheet by said first primary printhead so as to prevent said first black ink from bleeding into an abutting multicolor portion of an image.

13. The ink jet printing apparatus of claim 8, wherein said slow-drying, first black ink for printing said first black image contains a microwave coupling substance for facilitating drying of said black images to prevent bleeding of said first black ink into abutting multicolor portions of images.

14. The ink jet printing apparatus of claim 13, wherein said microwave coupling substance is ammonium chloride.

15. The ink jet printing apparatus of claim 13, wherein said slow-drying first black ink further contains benzyl alcohol for facilitating penetration of said ink into the receiving sheet.

* * * * *